United States Patent Office 3,081,354
Patented Mar. 12, 1963

3,081,354
METHOD OF PREPARING ADDUCTS OF ETHENOXY-SUBSTITUTED GLYCIDYL ETHERS AND ALCOHOLS OR MERCAPTANS
Van R. Gaertner and Donald N. Van Eenam, Dayton, Ohio, assignors to Monsanto Chemical Company, St. Louis, Mo., a corporation of Delaware
No Drawing. Filed Feb. 17, 1960, Ser. No. 9,158
18 Claims. (Cl. 260—609)

This invention relates to adducts of ethenoxy-substituted glycidyl ethers and alcohols or mercaptans. More particularly, this invention relates to novel methods for the preparation of the ethenoxy-substituted glycidyl ether and alcohol or mercaptan adducts from an ethylene glycol, epichlorohydrin and an alcohol or a mercaptan. This invention especially contemplates the preparation of the adducts of ethenoxy-substituted glycidyl ethers and alcohols or mercaptans as new compounds.

The preparation of the adducts of ethylene glycol and ether-substituted glycidyl ethers or glycidyl thioethers by condensing a glycidyl ether or thioether of an alcohol or mercaptan with an ethylene glycol is disclosed and claimed in our copending application Serial No. 9,160 filed of even date. Unfortunately, the adducts of the alkylphenols and the alkyl mercaptans or alkylthiophenols cannot be produced in high yields in that process because unconverted starting materials are difficult to separate from the reaction mixture and react readily with the oxirane group of the glycidyl ether formed to produce side-reaction products. Since the adducts of ethylene glycol and ether-substituted glycidyl ethers or glycidyl thioethers have very high detersive and lime soap dispersion efficiencies and, therefore, are very useful in soap and detergent compositions, it is desirable to provide a method for producing these adducts in high yields.

An object of this invention is to provide an improved method for producing adducts of ethylene glycol and alkaryl glycidyl ethers or alkyl or alkaryl thioethers in high yields.

Another object of this invention is to provide a method for producing adducts of ethenoxy-substituted glycidyl ethers and alcohol or a mercaptan.

Another object of this invention is to provide an improved method for producing adducts of ethenoxy-substituted glycidyl ethers and an alcohol or a mercaptan from an ethylene glycol, epichlorohydrin, and an alkyl or alkaryl alcohol i.e., an alkylphenol, or mercaptan.

Other aspects, objects and advantages of this invention will be apparent from a consideration of the accompanying disclosure and the appended claims.

In accordance with this invention, an ethylene glycol is reacted with epichlorohydrin to form an ethenoxy-substituted chloropropanol which is then reacted with an alcohol or a mercaptan in an alkaline reaction mixture to form an adduct of an ethenoxy-substituted glycidyl ether and an alcohol or a mercaptan. The reaction of the ethylene glycol and epichlorohydrin can be illustrated by the following equation:

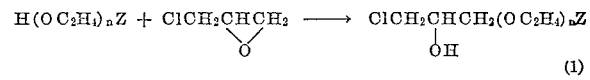
(1)

wherein Z is selected from the group consisting of hydroxy, alkoxy, and chloro and $n$ is an integer of from 1 to 100. The reaction of the ethenoxy-substituted chloropropanol formed in the first step with the alcohol or mercaptan will be illustrated by the following equation:

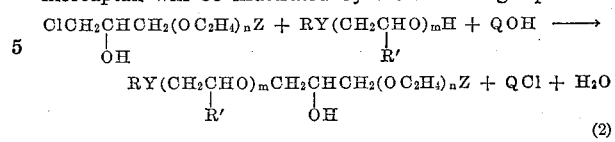
(2)

wherein R is selected from the group consisting of alkyl and alkaryl radicals having from 8 to 24 carbon atoms, Y is selected from the group consisting of oxygen and sulfur, $m$ is a whole number of from 0 to 10 inclusive, R' is selected from the group consisting of hydrogen, hydroxymethyl, chloromethyl, alkoxymethyl, aroxymethyl, alkaroxymethyl, and alkyl radicals, each of said R' being the same or different when $m$ is greater than 1, and Q is an alkaline cation selected from the group consisting of alkali metal and alkaline earth metal. The product of the second step is described as an adduct of an ethenoxy-substituted glycidyl ether and an alcohol or a mercaptan; however, the glycidyl ether is not separated and recovered as a pure compound but is formed in situ in the reaction zone and is the functional group involved in the reaction. The adduct of ethenoxy-substituted glycidyl ether and alcohol or mercaptan obtained in the second step is the same as the adduct of ethylene glycol and ether-substituted glycidyl ether or glycidyl thioether produced in the process described and claimed in our copending application Serial No. 9,160. Although these products are identified by different names in the separate applications because they are produced from different reactants, they are identical and it will be so understood in this specification and claims.

The ethylene glycol reactants which are useful in the present invention can be represented by the formula $$H(OC_2H_4)_nZ$$

wherein $n$ and Z are as above defined. In this formula, Z is chloro, hydroxy, or a lower alkoxy radical, preferably, an alkoxy radical wherein the alkyl group of the alkoxy radical contains from 1 to 6 carbon atoms. Illustrative examples of such alkyl radicals include methyl, ethyl, propyl, isopropyl, butyl, isobutyl, pentyl, hexyl, isohexyl, tert-butyl, 2-methylbutyl, 2,2-dimethylpropyl, and 2-methylpentyl radicals. In this formula, $n$, which is an integer of from 1 to 100, inclusive, represents the number of ethenoxy groups in the ethylene glycol molecule. Although $n$ can be an integer which is a whole number, usually $n$ is a fractional part of a whole number which is customarily written as a decimal because the ethylene glycols usually comprise a mixture of polymers having various numbers of ethenoxy groups. Ordinarily, the polyethylene glycols are identified by the average molecular weight of the product and a polyethylene glycol of average molecular weight, say, 200 will contain some polyethylene glycol molecules of substantially less than 200 molecular weight as well as some molecules of substantially greater than 200 molecular weight. For this reason, the adducts are described in this specification and claims as adducts of an ethenoxy-substituted glycidyl ether of a specific average molecular weight and an alcohol or a mercaptan instead of being described as compounds of specific compositions. However, a polyethylene glycol of average molecular weight 200 can be identified as a tetraethylene glycol since there are approximately 4.1 ethenoxy groups in the molecule and $n$ in the formula given above is 4.1. Similarly, a polyethylene glycol of average molecular weight 300 can be identified as hexaethylene glycol since there are 6.4 ethenoxy groups per molecule and $n$ is 6.4. In the same manner, other polyethylene glycols of defined average molecular weight can be assigned to generic names such as nonaethylene glycol, where the average molecular weight is 400, tridecaethylene glycol where the average molecular weight is 600, heptadecaethylene glycol where the average molecular weight is 800, docosaethylene glycol where the average molecular weight is 1000, and tritriacontaethylene glycol where the average molecular weight is 1500, and the like.

The ethylene glycols, including the chloro-substituted and alkoxy-substituted polyethylene glycols, are readily available commercial products. Well known polyethylene glycols are available on the market under the trade name "Carbowax," manufactured by the Union Carbide Chemical Co. of New York. The various "Carbowax" polyethylene glycols are distinguished from each other by numbers which are indicative of the average molecular weight of the materials; that is, Carbowax 200 polyethylene glycol has an average molecular weight of 190–210 and Carbowax 600 polyethylene glycol has an average molecular weight of 570–630. Although these commercially available polyethylene glycols are preferred in this invention, any ethylene glycol can be used in the process of this invention.

Reaction of the ethylene glycol with epichlorohydrin as shown in Equation 1 takes place readily by contacting the ethylene glycol with the epichlorohydrin in an acid reaction system, advantageously at an elevated temperature, and then allowing the resulting reaction mixture to stand until the desired product, an ethenoxy-substituted chloropropanol, has been formed. Ordinarily, an acidic catalyst can be either hydrofluoric acid, perchloric acid, alkanesulfonic acid, arenesulfonic acid, or a Lewis type acid, such as aluminum chloride, boron trifluoride, stannic chloride, ferric chloride, and the like. Boron trifluoride is a preferred catalyst. The amount of the catalyst present in the reaction zone can be varied over wide limits as determined by the particular reactants used, by the temperature desired, and by the reaction time selected. Ordinarily, the catalyst will be present only in catalytic amounts and can be present in an amount between 0.01% and 5.0% by weight of the amount of ethylene glycol reactant.

Although some reaction of the ethylene glycol with the epichlorohydrin takes place at room temperature, it is usually preferred to use a temperature above about 50° C. in order to obtain suitable yields in a usable reaction time. Ordinarily, temperatures above approximately 120° C. should not be used since the reactants are unstable in this reaction system at the more elevated temperatures.

The reaction of the ethylene glycol and the epichlorohydrin is usually carried out at substantially atmospheric pressure although either subatmospheric or superatmospheric pressures can be used if desired.

Although the ethylene glycol and epichlorohydrin can be reacted in approximately stoichiometric proportions, it is generally preferred to have an excess of the ethylene glycol present in the reaction system at all times in order to avoid the formation of undesirable side-reaction products. Preferably, the ethylene glycol is present in an amount greater than 2 moles of ethylene glycol per mole of the epichlorohydrin and in many reaction systems the proportions are substantially greater. In order to have an excess of the ethylene glycol present at all times, the reaction is usually conducted by the slow dropwise addition of the epichlorohydrin to a mixture of the ethylene glycol and the catalyst.

The reaction of the ethylene glycol and epichlorohydrin is primarily an addition-type reaction resulting in the formation of an ethenoxy-substituted chloropropanol as a single product. Although some reaction conditions may result in the formation of by-products, necessitating a separation step to remove the same, usually the ethenoxy-substituted chloropropanol is formed in nearly quantitative yields so that it is not necessary to subject this reaction mixture to purification steps before conducting the second reaction step involving the reaction with the alcohol or mercaptan.

The ethenoxy-substituted chloropropanol, more particularly 3-[(2-hydroxyethoxy)ethenoxy]-1-chloro-2-propanol or 3-[(2-hydroxyethoxy)polyethenoxy]-1-chloro-2-propanol where Z is hydroxy, 3-[(2-chloroethoxy)ethenoxy]-1-chloro-2-propanol or 3-[(2-chloroethoxy)polyethenoxy]-1-chloro-2-propanol where Z is chloro, or 3-[(2-alkoxyethoxy)ethenoxy]-1-chloro-2-propanol or 3-[(2-alkoxyethoxy)polyethenoxy]-1-chloro-2-propanol where Z is alkoxy, is reacted with the alcohol or mercaptan in the second reaction step without separation from the unconverted ethylene glycol present in the reaction mixture obtained in the first reaction step. Although the ethenoxy-substituted chloropropanol can be separated from the excess ethylene glycol, it is preferred to use this reactant in the ethylene glycol mixture without further separation and then effect separation of the unconverted ethylene glycol in the separation and recovery of the adduct from the reaction mixture obtained in reaction 2.

The alcohol reactants useful in the process of this invention are either an alkyl or an alkaryl alcohol of the formula

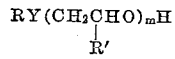

wherein Y, R, R', and $m$ are as above defined. The mercaptan reactants which are useful in the process of this invention are either an alkyl or an alkaryl mercaptan of the formula

wherein R is as above defined.

The alkyl and alkaryl radicals defined by R have a total of at least 8 carbon atoms per molecule and may contain as many as 24 carbon atoms in either a straight-chain or branched-chain arrangement. Illustrative examples of some suitable alkyl radicals identified by R include the 2-ethylhexyl, isononyl, n-dodecyl, tert-dodecyl, 2-propylheptyl, 5-ethylnonyl, 2-butyloctyl, n-tetradecyl, n-pentadecyl, tert-octadecyl, 2,6,8-trimethylnonyl, and 7-ethyl-2-methyl-4-undecyl radicals. The alkyl radicals may also include unsaturated alkyl radicals such as oleyl, dodecenyl, hexadecenyl radicals and the like. An especially valuable class of alkyl radicals is derived from an olefin monomer, dimer, trimer, tetramer, pentamer or the like, carbon monoxide and hydrogen according to the "Oxo" process. Such alkyl radicals include the branched-chain tridecyl radicals derived from propylene tetramer or butylene trimer, the branched-chain decyl radicals derived from propylene trimer, the branched-chain hexadecyl radicals derived from propylene pentamer, and the branched-chain nonyl radicals derived from diisobutylene. The alkaryl radicals, also defined by R, can include the monoalkylated as well as the polyalkylated aryl radicals. Illustrative examples of some alkaryl radicals which can be used include tert-octylphenyl, nonylphenyl, 2-ethylheptylphenyl, decylphenyl, 4-tert-dodecylphenyl, 2-tridecylphenyl, 3-tert-octadecylphenyl, 2-nonyl-1-naphthyl, 1-(2-butyloctyl)-2-naphthyl, 2,4-dimethylphenyl, 3-butylphenyl, and 2,4-dinonylphenyl radicals.

The alkyl radicals in the alcohol reactants, identified in the formula above by R', are preferably the alkyl radicals containing less than 24 carbon atoms arranged in either straight-chain or branched-chain configuration. Illustrative examples of such alkyl radicals include methyl, ethyl, propyl, isopropyl, butyl, isobutyl, pentyl, hexyl, isohexyl, tert-butyl, 2-methylbutyl, 2,2-dimethylpropyl, and 2-methylpentyl radicals. R' can also be either a hydrogen, chloromethyl, hydroxymethyl, aroxymethyl, alkaroxymethyl, or alkoxymethyl radical, preferably having less than 24 carbon atoms in the alkyl groups. When $m$ in the formula above is a whole number greater than 1, the number of radicals identified by R' is greater than 1 and these radicals can each be the same or different; that is, when $m$ is 2, there are two lower alkyl radicals in the formula and, for example, both alkyl radicals can be either methyl or propyl radicals or one alkyl radical can be a methyl radical and the other can be a propyl radical. Further, when $m$ is greater than 1, each R' can be the same or R' can be hydrogen and lower alkyl and/or chloromethyl and/or hydroxymethyl and/or aroxymethyl radicals, and the like, depending upon the size of $m$.

As shown in the formula above for the alcohol reactants, the R' is attached to the 1-carbon atom, i.e., the carbon atom adjacent to the oxygen atom of the ethenoxy group. However, the formation of the alcohol reactants usually results in the formation of some isomers wherein the R' is attached to the 2-carbon atom which is separated from the oxygen atom of the ethenoxy group by a methylene group, as follows:

Although the predominant product is one in which the R' is attached to the carbon atom in the 1-position, it is also intended in this specification and the claims to include the alcohols wherein the R' is attached to the carbon atom in the 2-position.

Similarly, R' is defined as being either a chloromethyl or a hydroxymethyl radical even though some alcohols are usually formed wherein a chloro group or a hydroxyl group, instead of a chloromethyl group or a hydroxymethyl group, is attached to the carbon atom in the 2-position and the ethenoxy group is a propenoxy group as shown in the following formulas:

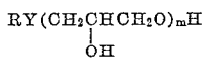

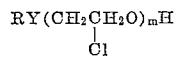

depending upon the direction of opening the epoxide ring. Since the predominant product is the alcohol having repeating ethenoxy groups with either chloromethyl or hydroxymethyl groups attached, only this structure is hereinafter referred to in this specification and claims; however, it is intended that the structure shown cover both configurations.

Thus, where $m$ is 0 and R is alkyl, the alcohol reactant is a simple alkanol, but where $m$ is 1 and R is alkyl, the alcohol reactant is 2-alkoxyethanol where R' is hydrogen; 1-alkoxy-2-alkanol where R' is alkyl; 1-alkoxy-3-chloro-2-propanol where R' is chloromethyl; 3-alkoxy-1,2-propanediol where R' is hydroxymethyl; 1,3-dialkoxy-2-propanol where R' is alkoxymethyl; 1-alkoxy-3-alkaroxy-2-propanol where R' is alkaroxymethyl; and 1-alkoxy-3-aroxy-2-propanol where R' is aroxymethyl. Similarly, where $m$ is greater than 1 and R is alkyl, the alcohol reactant is 2-[2-alkoxypoly)ethenoxy)]ethanol where R' is hydrogen; 1-[1-alkoxypoly)alkenoxy)]-2-alkanol where R' is alkyl; 1-[1-alkoxypoly(3-chloro-2-propoxy)]-3-chloro-2-propanol where R' is chloromethyl; 1 - [1 - alkoxypoly(3 - hydroxy - 2 - propenoxy)] - 3-hydroxy-2-propanol where R' is hydroxymethyl; 1-[1-alkoxypoly(3 - alkoxy - 2 - propenoxy)] - 3 - alkoxy - 2-propanol where R' is alkoxymethyl; 1-[1-alkoxypoly(3-alkaroxy-2-propenoxy)]-3-alkaroxy-2-propanol where R' is alkaroxymethyl; and 1-[1-alkoxypoly(3-aroxy-2-propenoxy)]-3-aroxy-2-propanol where R' is aroxymethyl. Also, where $m$ is 0 and R is alkaryl, the alcohol reactant is a simple alkylphenol, but where $m$ is 1 and R is alkaryl, the alcohol reactant is 2-alkaroxymethanol where R' is hydrogen; 1-alkaroxy-2-alkanol where R' is alkyl; 1-alkaroxy-3-chloro-2-propanol where R' is chloromethyl; 3-alkaroxy-1,2-propanediol where R' is hydroxymethyl; 1-alkaroxy-3-alkoxy-2-propanol where R' is alkoxymethyl; 1,3-di-alkaroxy-2-propanol where R' is alkaroxymethyl; and 1-alkaroxy-3-aroxy-2-propanol where R' is aroxymethyl. Similarly, where $m$ is greater than 1 and R is alkaryl, the alcohol reactant is 2-[2-alkaroxypoly(ethenoxy)]ethanol where R' is hydrogen; 1-[1-alkaroxypoly(alkenoxy)]-2-alkanol where R' is alkyl; 1-[1 - alkaroxypoly(3 - chloro - 2 - propenoxy)] - 3 - chloro-2-propanol where R' is chloromethyl; 1-[1-alkaroxypoly(3 - hydroxy - 2 - propenoxy)] - 3 - hydroxy - 2-propanol where R' is hydroxymethyl; 1-[1-alkaroxypoly-(3-alkoxy-2-propenoxy)]-3-alkoxy-2-propanol where R' is alkoxymethyl; 1-[1-alkaroxypoly(3-alkaroxy-2-propenoxy)]-3-alkaroxy-2-propanol where R' is alkaroxy; and 1 - [1 - alkaroxypoly(3 - aroxy - 2 - propenoxy)] - 3-aroxy-2-propanol where R' is aroxy.

In the same manner, where $m$ is 0 and R is alkyl, the reactant is a simple alkyl mercaptan, but where $m$ is 1 and R is alkyl, the alcohol reactant is 2-(alkylthio)-ethanol where R' is hydrogen; 1-alkylthio-2-alkanol where R' is alkyl; 1-alkylthio-3-chloro-2-propanol where R' is chloromethyl; 3-alkylthio-1,2-propanediol where R' is hydroxymethyl; 1-alkylthio-3-alkoxy-2-propanol where R' is alkoxymethyl; 1-alkylthio-3-alkaroxy-2-propanol were R' is alkaroxy; and 1-alkylthio-3-aroxy-2-propanol where R' is aroxymethyl. Similarly, where $m$ is greater than 1 and R is alkyl, the alcohol reactant is 2-[2-alkylthiopoly(ethenoxy)]ethanol where R' is hydrogen; 1-[-alkylthiopoly(alkenoxy)]-2-alkanol where R' is alkyl; 1-[1-alkylthiopoly(3-chloro-2-propenoxy)]-3-chloro-2-propanol where R' is chloromethyl; 3-[1-alkylthiopoly(3-hydroxy-2-propenoxy)]-1,2-propanediol where R' is hydroxymethyl; 1-[1-alkylthiopoly(3-alkoxy-2-propenoxy)]-3-alkoxy-2-propanol where R' is alkoxymethyl; 1-[1 - alkylthiopoly(3 - alkaroxy - 2 - propenoxy)] - 3-alkaroxy-2-propanol where R' is alkaroxymethyl; and 1-[1 - alkylthiopoly(3 - aroxy - 2 - propenoxy)] - 3 - aroxy-2-propanol where R' is aroxymethyl. Also, where $m$ is 0 and R is alkaryl, the reactant is a simply alkylthiophenol but where $m$ is 1 and R is alkaryl, the alcohol reactant is 2-alkarylthioethanol where R' is hydrogen; 1-alkarylthio-2-alkanol where R' is alkyl; 1-alkarylthio-3-chloro-2-propanol where R' is chloromethyl; 3-alkarylthio-1,2-propanediol where R' is hydroxymethyl; 1-alkarylthio-3-alkoxy-2-propanol where R' is alkoxymethyl; 1-alkarylthio-3-alkaroxy-2-propanol where R' is alkaroxy; and 1-alkarylthio-3-aroxy-2-propanol where R' is aroxy. Similarly, where $m$ is greater than 1 and R is alkaryl, the alcohol reactant is 2-[2-alkarylthiopoly-(ethenoxy)]ethanol where R' is hydrogen; 1-[1-alkarylthiopoly(alkenoxy)]-2-alkanol where R' is alkyl; 1-[1-alkarylthiopoly(3 - chloro - 2 - propenoxy)] - 3 - chloro-2-propanol where R' is chloromethyl; 3-[1-alkarylthiopoly(3-hydroxy-2-propenoxy]-1,2-propanediol where R' is hydroxymethyl; 1-[1-alkarylthiopoly(3-alkoxy-2-propenoxy)]-3-alkoxy-2-propanol where R' is alkoxymethyl; 1 - [1 - alkarylthiopoly(3 - alkaroxy - 2 - propenoxy)]-3-alkaroxy-2-propanol where R' is alkaroxymethyl; and 1 - [1 - alkaroxythiopoly(3 - aroxy - 2 - propenoxy)]-3-aroxy-2-propanol where R' is aroxymethyl.

Illustrative examples of some of these alcohol and mercaptan reactants are as follows:

n-Dodecanol
Nonyl mercaptan
2,4-dinonylphenol
Dodecylthiophenol
2-tert-octadecyloxyethanol
2-nonylphenylthioethanol
1-(2-propylheptylthio)-2-propanol 1-n-hexadecyloxy-2-propanol
1-n-hexadecylthio-3-chloro-2-propanol
1-(2,4-dinonylphenylthio)-2-butanol
1-(2,4-dinonylphenoxy)-3-chloro-2-propanol
1-n-hexadecyloxy-2-butanol
3-n-octadecylthio-1,2-propanediol
3-(4-tert-dodecylphenoxy)-1,2-propanediol
3-n-octadecyloxy-1,2-propanediol
3-(2-nonylphenylthio)-1,2-propanediol
1-n-hexadecyloxy-3-phenoxy-2-propanol
1-(2-decylphenylthio)-3-phenoxy-2-propanol
2-(2-butyloctylthioethoxy)ethanol
2-(2-decylphenoxyethoxy)ethanol
1-(1-tridecylthio-3-chloro-2-propoxy)-3-chloro-2-propanol
1-(1-n-hexadecylthio-2-propoxy)-2-propanol
1-(1-n-octylphenoxy-2-hexoxy)-2-hexanol
1-(1-dodecyloxy-2-butoxy)-2-butanol
1-(1-n-octadecyloxy-3-phenoxy-2-propoxy)-3-phenoxy-2-propanol
3-[1-(2-hexylphenylthio)-3-hydroxy-2-propoxy]-1,2-propanediol
2-[2-ethylhexylthiotri(ethenoxy)]ethanol
2-[2-(4-tert-dodecylphenoxy)tri(ethenoxy)]ethanol
1-[1-octyloxytri(3-chloro-2-propenoxy)]-3-chloro-2-propanol
1-[1-(2-nonylphenylthio)tri(3-hydroxy-2-propenoxy)]-1,2-propanediol
1-[1-tert-dodecylthiotri(2-butenoxy)]-2-butanol
2-[2-isononyloxyhexa(ethenoxy)]ethanol
3-[1-(2-tridecylphenoxy)hexa(3-hydroxy-2-propenoxy)]-1,2-propanediol
1-[1-(3-butylphenoxy)hexa(3-chloro-2-propenoxy)]-3-chloro-2-propanol
1-[1-isodecylthiohexa(3-phenoxy-2-propenoxy)]-3-phenoxy-2-propanol
1-[1-(2-dodecylphenoxy)-2-butoxy]-2-propanol
2-{1-[1-(1-tert-dodecylthio)-3-chloro-2-propoxy]-2-propoxy}-ethanol The alcohol and mercaptan reactants used in the process of this invention can be readily prepared from a suitable alcohol or mercaptan and an epoxyalkane or derivative thereof by alkenoxylating the desired molar quantities of each of the reactants in the presence of an acid-type catalyst such as boron trifluoride or an alkaline type catalyst such as sodium hydroxide at a temperature in the range of from 50° C. to 160° C. The preparation of some of these alcohols and mercaptans is described in copending application Serial No. 843,353, filed September 30, 1959. This invention is not limited by the method by which the alcohol or mercaptan reactants are made and alcohol and mercaptan reactants prepared by any method can be used in the practice of this invention.

Reaction of the ethenoxy-substituted chloropropanol obtained in the first reaction step with the alcohol or mercaptan reactant must be conducted in an alkaline reaction system as shown in Equation 2 above. The alkaline reagent is not only a reactant in the reaction but is also a catalyst and, therefore, must be present in the reaction mixture in an amount which is a slight excess over the stoichiometric amount required in the reaction. The amount of the excess alkaline reagent may be very small, such as a catalytic amount, or an amount as large as 50% by weight of the amount of epichlorohydrin used in the first step. The alkaline reagent may be either an alkali metal or an alkaline earth metal oxide, hydroxide, carbonate, or the like which are alkaline reacting. Suitable alkaline reagents include sodium oxide, potassium oxide, lithium oxide, sodium hydroxide, potassium hydroxide, lithium hydroxide, sodium carbonate, potassium carbonate, lithium carbonate, magnesium hydroxide, calcium hydroxide, barium hydroxide, strontium hydroxide, magnesium carbonate, calcium carbonate, strontium carbonate, barium oxide, and the like. Preferably, the alkaline reagent is sodium hydroxide.

Reaction of the ethenoxy-substituted chloropropanol and alcohol or mercaptan, and alkaline reagent, can be carried out in any manner; that is, the alkaline reagent and the ethenoxy-substituted chloropropanol can first be admixed together with the alcohol or mercaptan added last, the ethenoxy-substituted chloropropanol, alcohol or mercaptan and the alkaline reagent all admixed simultaneously together, or the ethenoxy-substituted chloropropanol and the alcohol or mercaptan admixed together first and the alkaline reagent added last. If the alkaline reagent and the ethenoxy-substituted chloropropanol are admixed together first before addition of the alcohol or mercaptan, a dilute aqueous solution of the alkaline reagent is used in order to avoid undesirable side reactions. The preferred method of conducting the second reaction step is to admix the ethenoxy-substituted chloropropanol and the alcohol or mercaptan together and then add the alkaline reagent as a last-added reactant.

Although the ethenoxy-substituted chloropropanol, alcohol or mercaptan, and alkaline reagent can be reacted together in approximately stoichiometric proportions, it is generally preferred to have a deficiency of the alcohol or mercaptan reactant present in the reaction zone because this reactant is difficult to separate from the adduct and is detrimental to the use of the adduct in soap and detergent compositions. Therefore, it is preferred that the ethenoxy-substituted chloropropanol be present in the reaction mixture in an amount which is at least equivalent to the amount of the alcohol or mercaptan reactant present and which may be as much as 10 equivalents based on the amount of the alcohol or mercaptan reactant. Based upon the amount of epichlorohydrin used in the first reaction step, there should be at least one mole of epichlorohydrin per mole of alcohol or mercaptan in the second step.

Although the reaction of the ethenoxy-substituted chloropropanol, alcohol or mercaptan, and alkaline reagent will take place at room temperature, long reaction times are required so that it is usually desirable to use a temperature at least above 50° C. as in the first reaction step. Preferably, the temperature is maintained in the range of from 50° C. to 120° C. and temperatures substantially above 120° C. are not desirable because the ethenoxy-substituted chloropropanol will condense at the higher temperatures and form undesirable side-reaction products.

The second reaction step of this invention is usually carried out at substantially atmospheric pressure although either subatmospheric or superatmospheric pressures can be used if desired.

The reaction of the ethenoxy-substituted chloropropanol, alcohol or mercaptan, and alkaline reagent is primarily a condensation type reaction resulting in the formation of the adduct and an inorganic salt of the alkaline reagent as products. Under some conditions, there is some formation of side-reaction products or by-products, but these can be readily removed from the reaction mixture by either vacuum steam distillation of the reaction mixture at an elevated temperature or by solvent extraction of the reaction mixture with an immiscible solvent such as hexane. There is usually also present in the reaction mixture some unconverted ethylene glycol reactant, since this reactant is used in excess in the first reaction step, and the presence of some unconverted ethylene glycol in the reaction mixture is desirable since it aids in removal of the side-reaction products by keeping the adduct in solution in the ethylene glycol. The excess ethylene glycol can be removed from the reaction mixture by extraction with a hot salt solution in which the ethylene glycol reactant is soluble and the adduct is substantially insoluble. In removing the excess ethylene glycol, the inorganic salt product formed in the reaction is also removed since this salt is soluble in the hot salt solution.

Suitable salt solutions include aqueous solutions of sodium chloride, potassium chloride, or the like. Preferably, the salt is present in the solution in an amount which gives a saturated solution at room temperature; however, a salt solution which is saturated at the elevated temperature where the extraction is carried out is also effective. This separation step cannot be carried out at room temperature but must be carried out at an elevated temperature since the adducts are more soluble in cold water than in hot water. Preferably, the extraction is carried out at a temperature near the boiling point of the salt solution and in all cases at a temperature above 60° C. After removal of the unconverted ethylene glycol reactant and the inorganic salt produced in the reaction, the product is dried to remove any water which may be present. The drying can be accomplished either by heating the product slightly under a reduced pressure or by contacting the product with a drying agent such as magnesium sulfate or calcium sulfate.

Where $m$ is a whole number of 1, R is alkyl, and R' is hydrogen, alcohol and polyethenoxy-substituted glycidyl ether adduct obtained as a product in the process of this invention is a 2-[3-(2-alkoxyethoxy)-2-hydroxy-1-propoxy]polyethenoxyethanol where Z is hydroxy, 2-[3-(2-alkoxyethoxy)-2-hydroxy-1-propoxy]-polyethenoxyethyl chloride where Z is chloride, or 2-[3-(2-alkoxyethoxy)-2-hydroxy-1-propoxy]polyethenoxyethyl alkyl ether where Z is alkoxy. Where $m$ is a whole number of 1, R is alkyl, and R' is alkyl, the adduct is 2-[3-(1alkoxy-2-alkylethoxy)-2-hydroxy-1-propoxy]polyethenoxyethanol where Z is hydroxy, 2-[3-(1-alkoxy-2-alkylethoxy)-2-hydroxy-1-propoxy]polyethenoxyethyl chloride where Z is chloride, or 2-[3-(1-alkoxy-2-alkylethoxy)-2-hydroxy-1-propoxy]polyethenoxyethyl alkyl ether where Z is alkoxy. Where $m$ is a whole number of 1, R is alkyl, and R' is chloromethyl, the adduct is an 2-[3-(1-alkoxy-3-hydroxy-2-propoxy)-2-hydroxy-1-propoxy]polyethenoxyethanol where Z is hydroxy, 2-[3-(1-alkoxy-3-chloro-2-propoxy)-2-hydroxy-1-propoxy]-polyethenoxyethyl chloride where Z is chloride, or 2-[3-(1-alkoxy-3-chloro-2-propoxy)-2-hydroxy-1-propoxy]polyethenoxyethyl alkyl ether where Z is alkoxy. Where $m$ is a whole number of 1, R is alkyl, and R' is hydroxymethyl, the adduct is a 2-[3-(1-alkoxy-3-hydroxy-2-propoxy)-2-hydroxy-1-propoxy]polyethenoxyethanol where Z is a hydroxy, 2-[3-(1-alkoxy-3-hydroxy-2-propoxy)-2-hydroxy-1-propoxy]polyethenoxyethyl chloride where Z is chloride, or 2-[3-(1-alkoxy-3-hydroxy-2-propoxy)-2-hydroxy-1-propoxy]polyethenoxyethyl alkyl ether where Z is alkoxy. Where $m$ is a whole number of 1, R is alkyl, and R' is alkoxymethyl, the adduct is a 2-[3-(1-alkoxy-3-alkoxy-2-propoxy)-2-hydroxy-1-propoxy]polyethenoxyethanol where Z is hydroxy, 2-[3-(1,3-dialkoxy-2-propoxy)-2-hydroxy-1-propoxy]polyethenoxyethyl chloride where Z is chloride or 2-[3-(1,3-dialkoxy-2-propoxy)-2-hydroxy-1-propoxy]polyethenoxyethyl alkyl ether where Z is alkoxy. Where $m$ is a whole number of 1, R is alkyl and R' is alkoxymethyl, the adduct is a 2-[3-(1-alkoxy-3-alkaroxy-2-propoxy)-2-hydroxy-1-propoxy]polyethenoxyethanol where Z is hydroxy, 2-[3-(1-alkoxy-3-alkaroxy-2-propoxy)-2-hydroxy-1-propoxy]polyethenoxyethyl chloride where Z is chloride, or 2-[3-(1-alkoxy-3-alkaroxy-2-propoxy)-2-hydroxy-1-propoxy]polyethenoxyethyl alkyl ether where Z is alkoxy. Where $m$ is a whole number of 1, R is alkyl, and R' is an oxymethyl, the adduct is a 2-[3-(1-alkoxy-3-aroxy-2-propoxy)-2-hydroxy-1-propoxy]polyethenoxyethanol where Z is hydroxy, 2-[3-(1-alkoxy-3-aroxy-2-propoxy)-2-hydroxy-1-propoxy]polyethenoxyethyl chloride where Z is chloride, or 2-[3-(1-alkoxy-3-aroxy-2-propoxy)-2-hydroxy-1-propoxy]polyethenoxyethyl alkyl ether where Z is alkoxy.

Similarly, where $m$ is a whole number greater than 1, R is alkyl, and R' is hydrogen, the adduct is a 2-[3-alkoxypoly-(ethenoxy)-2-hydroxy-1-propoxy]polyethenoxyethanol where Z is hydroxy, 2-[3-alkoxypoly-(ethenoxy)-2-hydroxy-1-propoxy]polyethenoxyethyl chloride where Z is chloride, or 2-[3-alkoxypoly(ethenoxy)-2-hydroxy-1-propoxy]-polyethenoxyethyl alkyl ether where Z is alkoxy. Where $m$ is a whole number greater than 1, R is alkyl, and R' is alkyl, the adduct is a 2-[3-alkoxypoly(alkenoxy)-2-hydroxy-1-propoxy]polyethenoxyethanol where Z is hydroxy, 2-[3-alkoxypoly(alkenoxy)-2-hydroxy-1-propoxy]polyethenoxyethyl chloride where Z is chloride, or 2-[3-alkoxypoly(alkenoxy)-2-hydroxy-1-propoxy]polyethenoxyethyl alkyl ether where Z is alkoxy. Where $m$ is a whole number greater than 1, R is alkyl and R' is chloromethyl, the adduct is a 2-{3-[1-alkoxypoly(3 - chloro - 2 - propenoxy)] - 2 - hydroxy-1-propoxy}polyethenoxyethanol where Z is hydroxy, 2-{3 - [1 - alkoxypoly(3 - chloro - 2 - propenoxy)] - 2 - hydroxy-1-propoxy}polyethenoxyethyl chloride where Z is chloride, or 2-{3-[1-alkoxypoly(3-chloro-2-propenoxy)]-2-hydroxy-1-propoxy}polyethenoxyethyl alkyl ether where Z is alkoxy. Where $m$ is a whole number greater than 1, R is alkyl and R' is hydroxymethyl, the adduct is a 2-{3-[1 - alkoxypoly(3 - hydroxy - 2 - propenoxy)] - 2 - hydroxy -1-propoxy}polyethenoxyethanol where Z is hydroxy, 2-{3-[1-alkoxypoly(3-hydroxy-2-propenoxy)]-2-hydroxy-1-propoxy}polyethenoxyethyl chloride where Z is chloride, or 2-{3-[1-alkoxypoly(3-hydroxy-2-propenoxy)]-2-hydroxy-1-propoxy}polyethenoxyethyl alkyl ether Z is alkoxy. Where $m$ is a whole number greater than 1, R is alkyl, and R' is alkoxymethyl, the adduct is a 2-{3-[1-alkoxypoly(3-alkoxy-2-propenoxy)]-2-hydroxy-1-propoxy}polyethenoxyethanol where Z is hydroxy, 2-{3-[1-alkoxypoly(3-alkoxy-2-propenoxy)]-2-hydroxy-1-propoxy}polyethenoxyethyl chloride where Z is chloride, or 2-{3-[1-alkoxypoly(3-alkoxy-2-propenoxy)]-2-hydroxy-1-propoxy}polyethenoxyethyl alkyl ether where Z is alkoxy. Where $m$ is a whole number greater than 1, R is alkyl, and R' is alkanoxymethyl, the adduct is a 2-{3-[1-alkoxypoly(3-alkaroxy-2-propenoxy)]-2-hydroxy-1-propoxy}polyethenoxyethanol where Z is hydroxy, 2-{3-[1-alkoxypoly(3-alkaroxy-2-propenoxy)]-2-hydroxy-1-propoxy}polyethenoxyethyl chloride where Z is chloride, or 2 - {3 - [1 - alkoxypoly(3-alkaroxy-2-propenoxy)]-2-hydroxy-1-propoxy}polyethenoxyethyl alkyl ether where Z is alkoxy. Where $m$ is a whole number greater than 1, R is alkyl, and R' is aroxymethyl, the adduct is a 2-{3-[1-alkoxypoly(3 - aroxy - 2 - propenoxy)] - 2 - hydroxy - 1 -propoxy}polyethenoxyethanol where Z is hydroxy, 2-{3-[1 - alkoxypoly(3 - aroxy - 2 - propenoxy)] - 2 - hydroxy-1-propoxy}-polyethenoxyethyl chloride where Z is chloride, or 2-{3-[1-alkoxypoly(3-aroxy-2-propenoxy)]-2-hydroxy-1-propoxy}polyethenoxyethyl alkyl ether where Z is alkoxy.

Where $m$ is a whole number of 1, R is alkaryl, and R' is hydrogen, the alcohol and polyethenoxy-substituted glycidyl ether adduct of this invention is an 2-[3-(alkaroxyethoxy) - 2 - hydroxy - 1 - propoxy]polyethenoxyethanol where Z is hydroxy, 2-[3-(2-alkaroxyethoxy)-2-hydroxy-1-propoxy]polyethenoxyethyl chloride where Z is chloride, or 2-[3-(2-alkaroxyethoxy)-2-hydroxy-1-propoxy]polyethenoxyethyl alkyl ether where Z is alkoxy. Where $m$ is 1, R is alkaryl, and R' is alkyl, the adduct is a 2-[3-(1-alkaroxy-2-alkylethoxy)-2-hydroxy-1-propoxy]polyethenoxyethanol where Z is hydroxy, 2-[3-(1-alkaroxy-2-alkylethoxy)-2-hydroxy - 1 - propoxy]-polyethenoxyethyl chloride where Z is chloride, or 2-[3-(1-alkaroxy-2-alkylethoxy)-2-hydroxy - 1 - propoxy]-polyethenoxyethyl alkyl ether where Z is alkoxy. Where $m$ is a whole number of 1, R is alkaryl, and R' is chloromethyl, the adduct is a 2-[3-(1-alkaroxy-3-chloro-2-propoxy)-2-hydroxy - 1 - propoxy]polyethenoxyethanol where Z is hydroxy, 2-[3-(1-alkaroxy-3-chloro-2-propoxy)(-2-hydroxy-1-propoxy]polyethenoxyethyl chloride where Z is chloride, or 2-[3-(1-alkaroxy-3-chloro-2-propoxy)-2-hydroxy-1-propoxy]polyethenoxyethyl alkyl ether where Z is alkoxy. Where $m$ is a whole number of 1, R is alkaryl, and R' is hydroxymethyl, the adduct is a 2-[3-(1-alkaroxy-3-hydroxy-2-propoxy)-2-hydroxy-1-propoxy]polyethenoxyethanol where Z is hydroxy, 2-[3-(1-alkaroxy-3-hydroxy-2-propoxy)-2-hydroxy - 1 - propoxy]polyethenoxyethyl chloride where Z is chloride, or 2-[3-(1-alkaroxy-3-hydroxy-2-propoxy) - 2 - hydroxy-1-propoxy]polyethenoxyethyl alkyl ether where Z is alkoxy. Where $m$ is a whole number of 1, R is alkaryl, and R' is alkoxymethyl, the adduct is a 2-[3-(1-alkaroxy-3-alkoxy - 2 - propoxy) - 2 - hydroxy - 1 - propoxy]polyethenoxyethanol where Z is hydroxy, 2-[3-(1-alkaroxy-3-alkoxy-2-propoxy)-2-hydroxy - 1 - propoxy]polyethenoxyethyl chloride where Z is chloride, or 2-[3-(1-alkaroxy-3-alkoxy-2-propoxy)-2-hydroxy - 1 - propoxy]polyethenoxyethyl alkyl ether where Z is alkoxy. Where $m$ is a whole number of 1, R is alkaryl, R' is alkaroxymethyl, the adduct is a 2-[3-(1,3-di-alkaroxy-2-propoxy)-2-hydroxy-1-propoxy]polyethenoxyethanol where Z is hydroxy, 2-[3-(1,3-di-alkaroxy-2-propoxy)-2-hydroxy-1-propoxy]polyethenoxyethyl chloride where Z is chloride, or 2-[3-(1,3-di-alkaroxy-2-propoxy)-2-hydroxy-1-propoxy]polyethenoxyethyl alkyl ether where Z is alkoxy. Where $m$ is a whole number of 1, R is alkaryl, and R' is aroxymethyl, the adduct is a 2-[3-(1-alkaroxy-3-aroxy-2-propoxy)-2-hydroxy - 1 - propoxy]polyethenoxyethanol where Z is hydroxy, 2-[3-(1-alkaroxy-3-aroxy-2-propoxy)-2-hydroxy - 1 - propoxy]polyethenoxyethyl chloride where Z is chloride, or 2-[3-(1-alkaroxy-3-aroxy-2-propoxy)-2-hydroxy - 1 - propoxy]polyethenoxyethyl alkyl ether where Z is alkoxy.

Also, where $m$ is greater than 1, R is alkaryl, and R' is hydrogen, the adduct is an 2-[3-alkaroxypoly(ethenoxy)-2-hydroxy-1-propoxy]polyethenoxyethanol where Z is hydroxy, 2-[3-alkaroxypoly(ethenoxy)-2-hydroxy-1-propoxy]polyethenoxyethyl chloride where Z is chloride, or 2-[3-alkaroxypoly(ethenoxy)-2-hydroxy-1-propoxy]polyethenoxyethyl alkyl ether where Z is alkoxy. Where $m$ is greater than 1, R is alkaryl, and R' is alkyl, the adduct is a 2-[3-alkaroxypoly(alkenoxy)-2-hydroxy-1-propoxy]polyethenoxyethanol where Z is hydroxy, 2-[3-alkaroxypoly(alkenoxy)-2-hydroxy - 1 - propoxy]polyethenoxyethyl chloride where Z is chloride, or 2-[3-alkaroxypoly(alkenoxy) - 2 - hydroxy - 1 - propoxy]polyethenoxyethyl alkyl ether where Z is alkoxy. Where $m$ is greater than 1, R is alkaryl and R' is chloromethyl, the adduct is a 2-{3-[1-alkaroxypoly(3 - chloro - 2 - propenoxy)]-2-hydroxy - 1 - propoxy}polyethenoxyethanol where Z is hydroxy, 2-{3-[1-alkaroxypoly(3-chloro-2-propenoxy)]-2-hydroxy - 1 - propoxy}polyethenoxyethyl chloride where Z is chloride, or 2-{3-[1-alkaroxypoly(3-chloro-2-propenoxy)]-2-hydroxy - 1 - propoxy}polyethenoxyethyl alkyl ether where Z is alkoxy. Where $m$ is greater than 1, R is alkaryl, and R' is hydroxymethyl, the adduct is a 2-{3-[1-alkaroxypoly(3-hydroxy-2-propenoxy)]-2-hydroxy - 1 - propoxy}polyethenoxyethanol where Z is hydroxy, 2-{3-[1-alkaroxypoly(3-hydroxy-2-propenoxy)]-2-hydroxy - 1 - propoxy}polyethenoxyethyl chloride where Z is chloride, or 2-{3-[1-alkaroxypoly(3-hydroxy-2-propenoxy)]-2-hydroxy - 1 - propoxy}polyethenoxyethyl alkyl ether where Z is alkoxy. Where $m$ is greater than 1, R is alkaryl, and R' is alkoxymethyl, the adduct is a 2-{3-[1-alkaroxypoly(3-alkoxy-2-propenoxy)]-2-hydroxy - 1 - propoxy}polyethenoxyethanol where Z is hydroxy, 2-{3-[1-alkaroxypoly(3-alkoxy-2-propenoxy)]-2-hydroxy - 1 - propoxy}polyethenoxyethyl chloride where Z is chloride, or 2-{3-[1-alkaroxypoly(3-alkoxy-2-propenoxy)]-2-hydroxy - 1 - propoxy}polyethenoxyethyl alkyl ether where Z is alkoxy. Where $m$ is greater than 1, R is alkaryl, and R' is alkaroxymethyl, the adduct is a 2-{3-[1-alkaroxypoly(3-alkoxy-2-propenoxy)]-2-hydroxy - 1 - propoxy}polyethenoxyethanol where Z is hydroxy, 2-{3-[1-alkaroxypoly(3-alkaroxy-2-propenoxy)]-2-hydroxy - 1 - propoxy}polyethenoxyethyl chloride where Z is chloride, or 2-{3-[1-alkaroxypoly(3-alkaroxy-2-propenoxy)]-2-hydroxy - 1 - propoxy}polyethenoxyethyl alkyl ether where Z is alkoxy. Where $m$ is greater than 1, R is alkaryl, and R' is aroxymethyl, the adduct is a 2-{3-[1-alkaroxypoly(3-aroxy-2-propenoxy)]-2-hydroxy - 1 - propoxy}polyethenoxyethanol where Z is hydroxy, or 2-{3-[1-alkaroxypoly(3-aroxy-2-propenoxy)]-2-hydroxy - 1 - propoxy}polyethenoxyethyl chloride where Z is chloride, or 2-{3-[1-alkaroxypoly(3-aroxy-2-propenoxy)]-2-hydroxy - 1 - propoxy}polyethenoxyethyl alkyl ether where Z is alkoxy.

Where $m$ is a whole number of 1, R is alkyl, and R' is hydrogen, the alcohol and polyethenoxy-substituted glycidyl ether adduct obtained as a product in the process of this invention is a 2-[3-(2-alkylthioethoxy)-2-hydroxy-1-propoxy]polyethenoxyethanol where Z is hydroxy, 2 - [3-(2-alkylthioethoxy)-2-hydroxy-1-propoxy]polyethenoxyethyl chloride where Z is chloride, or 2-[3-(2-alkylthioethoxy) - 2 - hydroxy - 1 - propoxy]polyethenoxyethyl alkyl ether where Z is alkoxy. Where $m$ is a whole number of 1, R is alkyl, and R' is alkyl, the adduct is a 2 - [3-(1-alkylthio-2-alkylethoxy)-2-hydroxy-1-propoxy]polyethenoxyethanol where Z is hydroxy, 2-[3-(1-alkylthio-2-alkylethoxy)-2-hydroxy - 1 - propoxy]polyethenoxyethyl chloride where Z is chloride, or 2-[3-(1 - alkylthio-2-alkylethoxy)-2-hydroxy-1-propoxy]polyethenoxyethyl alkyl ether where Z is alkoxy. Where $m$ is a whole number of 1, R is alkyl, and R' is chloromethyl, the adduct is a 2-[3-(1-alkylthio-3-hydroxy-2-propoxy)-2-hydroxy - 1 - propoxy]polyethenoxyethanol where Z is hydroxy, 2-[3-(1-alkylthio-3-chloro-2-propoxy)-2-hydroxy-1-propoxy]polyethenoxyethyl chloride where Z is chloride, or 2-[3-(1-alkylthio-3-chloro-2-propoxy)-2-hydroxy - 1 - propoxy]polyethenoxyethyl alkyl ether where Z is alkoxy. Where $m$ is a whole number of 1, R is alkyl, and R' is hydroxymethyl, the adduct is a 2-[3-(1-alkylthio-3-hydroxy-2-propoxy) - 2 - hydroxy-1-propoxy]polyethenoxyethanol where Z is hydroxy, 2-[3-(1-alkylthio-3-hydroxy-2-propoxy)-2-hydroxy - 1 - propoxy]polyethenoxyethyl chloride where Z is chloride, or 2-[3-(1-alkylthio-3-hydroxy-2-propoxy) - 2 - hydroxy-1-propoxy]polyethenoxyethyl alkyl ether where Z is alkoxy. Where $m$ is a whole number of 1, R is alkyl, and R' is alkoxymethyl, the adduct is a 2-[3-(1-alkylthio-3-alkoxy-2-propoxy) - 2 - hydroxy - 1 - propoxy]polyethenoxyethanol where Z is hydroxy, 2-[3-(1-alkylthio-3-alkoxy-2-propoxy)-2-hydroxy - 1 - propoxy]polyethenoxyethyl chloride where Z is chloride, or 2-[3-(1-alkylthio-3-alkoxy-2-propoxy)-2-hydroxy - 1 - propoxy]polyethenoxyethyl alkyl ether where Z is alkoxy. Where $m$ is a whole number of 1, R is alkyl and R' is alkaroxymethyl the adduct is a 2-(1-alkylthio-3-alkaroxy-2-propoxy)-2-hydroxy-1-propoxy]polyethenoxyethanol where Z is hydroxy, 2-[3-(1-alkylthio-3-alkaroxy-2-propoxy)-2-hydroxy-1-propoxy]polyethenoxyethyl chloride where Z is chloride, or 2-[3-(1-alkylthio-3-alkaroxy-2-propoxy)-2-hydroxy-1-propoxy]polyethenoxyethyl alkyl ether where Z is alkoxy. Where $m$ is a whole number of 1, R is alkyl, and R' is aroxymethyl, the adduct is a 2-[3-(1-alkylthio-3-aroxy-2-propoxy)-2-hydroxy - 1 - propoxy]polyethenoxyethanol where Z is hydroxy, 2-[3-(1-alkylthio-3-aroxy-2-propoxy)-2-hydroxy - 1 - propoxy]polyethenoxyethyl chloride where Z is chloride, or 2-[3-(1-alkylthio-3-aroxy-2-propoxy)-2-hydroxy - 1 - propoxy]polyethenoxyethyl alkyl ether where Z is alkoxy.

Similarly, where $m$ is a whole number greater than 1, R is alkyl, and R' is hydrogen, the adduct is a 2-[3-alkylthiopoly(ethenoxy)-2-hydroxy - 1 - propoxy]polyethenoxyethanol where Z is hydroxy, 2-[3-alkylthiopoly(ethenoxy)-2-hydroxy - 1 - propoxy]polyethenoxyethyl chloride where Z is chloride, or 2-[3-alkylthiopoly(ethenoxy)-2-hydroxy - 1 - propoxy]polyethenoxyethyl alkyl ether where Z is alkoxy. Where $m$ is a whole number greater than 1, R is alkyl, and R' is alkyl, the adduct is a 2 - [3 - alkylthiopoly(alkenoxy) - 2 - hydroxy-1-propoxy]polyethenoxyethanol where Z is hydroxy, 2-[3-alkylthiopoly(alkenoxy)-2-hydroxy - 1 - propoxy]polyethenoxyethyl chloride where Z is chloride, or 2-[3-alkylthiopoly(alkenoxy)-2-hydroxy - 1 - propoxy]polyethenoxyethyl alkyl ether where Z is alkoxy. Where m is a whole number greater than 1, R is alkyl, and R' is chloromethyl, the adduct is a 2-{3-[1-alkylthiopoly(3-chloro-2-propenoxy)]-2-hydroxy - 1 - propoxy}polyethenoxyethanol where Z is hydroxy, 2-{3-[1-alkylthiopoly(3-chloro-2 - propenoxy)]-2-hydroxy-1-propoxy}polyethenoxyethyl chloride where Z is chloride, or 2-{3-[1-alkylthiopoly(3-chloro-2-propenoxy)] - 2 - hydroxy - 1 - propoxy}polyethenoxyethyl alkyl ether where Z is alkoxy. Where m is a whole number greater than 1, R is alkyl, and R' is hydroxymethyl, the adduct is a 2-{3-[1-alkylthiopoly(3-hydroxy-2-propenoxy)]-2-hydroxy - 1 - propoxy}polyethenoxyethanol where Z is hydroxy, 2-{3-[1-alkylthiopoly(3-hydroxy-2-propenoxy)]-2-hydroxy - 1 - propoxy}-polyethenoxyethyl chloride where Z is chloride, or 2-{3-[1 - alkylthiopoly(3-hydroxy-2-propenoxy)]-2-hydroxy-1-propoxy}polyethenoxyethyl alkyl ether where Z is alkoxy. Where m is a whole number greater than 1, R is alkyl, and R' is alkoxymethyl, the adduct is a 2-{3-[1-alkylthiopoly(3-alkoxy-2-propenoxy)] - 2 - hydroxy - 1-propoxy}polyethenoxyethanol where Z is hydroxy, 2-{3-[1-alkylthiopoly(3-alkoxy-2-propenoxy)] - 2 - hydroxy-1-propoxy}polyethenoxyethyl chloride where Z is chloride, or 2-{3-[1-alkylthiopoly(3-alkoxy-2-propenoxy)]-2-hydroxy - 1 - propoxy}polyethenoxyethyl alkyl ether where Z is alkoxy. Where m is a whole number greater than 1, R is alkyl, and R' is alkaroxymethyl, the adduct is a 2-{3-[1-alkylthiopoly(3-alkaroxy-2-propenoxy)]-2-hydroxy-1-propoxy}polyethenoxyethanol where Z is hydroxy, 2-{3-[1-alkylthiopoly(3-alkaroxy-2-propenoxy)]-2-hydroxy-1-propoxy}polyethenoxyethyl chloride where Z is chloride, or 2-{3-[1-alkylthiopoly(3-alkaroxy-2-propenoxy)]-2-hydroxy-1-propoxy}polyethenoxyethyl alkyl ether where Z is alkoxy. Where m is a whole number greater than 1, R is alkyl, and R' is aroxymethyl, the adduct is a 2-{3-[1-alkylthiopoly(3-aroxy-2-propenoxy)]-2-hydroxy-1-propoxy}polyethenoxyethanol where Z is hydroxy, 2-{3-[1-alkylthiopoly(3-aroxy-2-propenoxy)]-2-hydroxy-1-propoxy}polyethenoxyethyl chloride where Z is chloride, or 2-{3-[1-alkylthiopoly(3-aroxy-2-propenoxy)]-2-hydroxy-1-propoxy}polyethenoxyethyl alkyl ether where Z is alkoxy.

Where m is a whole number of 1, R is alkaryl, and R' is hydrogen, the mercaptan and polyethenoxy-substituted glycidyl ether adduct of this invention is a 2-[3-(alkarylthioethoxy)-2-hydroxy - 1 - propoxy]polyethenoxyethanol where Z is hydroxy, 2-[3-(2-alkarylthiothoxy)-2-hydroxy-1-propoxy]polyethenoxyethyl chloride where Z is chloride, or 2-[3-(2-alkarylthioethoxy)-2-hydroxy - 1 - propoxy]-polyethenoxyethyl alkyl ether where Z is alkoxy. Where m is 1, R is alkaryl, and R' is alkyl, the adduct is a 2-[3-(1-alkarylthio-2-alkylethoxy)-2-hydroxy - 1 - propoxy]polyethenoxyethanol where Z is hydroxy, 2-[3-(1-alkarylthio-2-alkylethoxy)-2-hydroxy - 1 - propoxy]polyethenoxyethyl chloride where Z is chloride, or 2-[3-(1-alkarylthio-2-alkylethoxy)-2-hydroxy - 1 - propoxy]polyethenoxyethyl alkyl ether where Z is alkoxy. Where m is a whole number of 1, R is alkaryl, and R' is chloromethyl, the adduct is a 2-[3-(1-alkarylthio-3-chloro-2-propoxy)-2-hydroxy - 1 - propoxy]-polyethenoxyethanol where Z is hydroxy, 2-[3-(1-alkarylthio-3-chloro-2-propoxy)-2-hydroxy-1-propoxy]polyethenoxyethyl chloride where Z is chloride, or 2-[3-(1-alkarylthio-3-chloro-2-propoxy)-2-hydroxy-1-propoxy]polyethenoxyethyl alkyl ether where Z is alkoxy. Where m is a whole number of 1, R is alkaryl, and R' is hydroxymethyl, the adduct is a 2-[3-(1-alkarylthio-3-hydroxy-2-propoxy) - 2 - hydroxy-1-propoxy]polyethenoxyethanol where Z is hydroxy, 2-[3-(1-alkarylthio-3-hydroxy-2 - propoxy)-2-hydroxy-1-propoxy]poly ethenoxyethyl chloride where Z is chloride, or 2-[3-(1-alkarylthio-3-hydroxy-2-propoxy)-2-hydroxy - 1-propoxy]polyethenoxyethyl alkyl ether where Z is alkoxy. Where m is a whole number of 1, R is alkaryl, and R' is alkoxymethyl, the adduct is a 2-[3-(1alkarylthio-3-alkoxy-2-propoxy)-2-hydroxy - 1 - propoxy]polyethenoxyethanol where Z is hydroxy, 2-[3-(1 - alkarylthio-3-alkoxy-2-propoxy)-2-hydroxy-1-propoxy]polyethenoxyethyl chloride where Z is chloride, or 2-[3-(1-alkarylthio-3-alkoxy-2-propoxy)-2-hydroxy-1-propoxy]-polyethenoxyethyl alkyl ether where Z is alkoxy. Where m is a whole number of 1, R is alkaryl, R' is alkaroxymethyl, the adduct is a 2-[3-(1-alkarylthio-3-alkaroxy - 2 - propoxy)-2-hydroxy-1-propoxy]polyethenoxyethanol where Z is hydroxy, 2-[3-(1-alkarylthio-3-alkaroxy - 2 - propoxy)-2-hydroxy-1-propoxy]polyethenoxyethyl chloride where Z is chloride, or 2-[3-(1-alkarylthio - 3 - alkaroxy-2-propoxy)-2-hydroxy-1-propoxy]-polyethenoxyethyl alkyl ether where Z is alkoxy. Where m is a whole number of 1, R is alkaryl, and R' is aroxymethyl, the adduct is a 2-[3-(1-alkarylthio-3-aroxy-2-propoxy)-2-hydroxy - 1 - propoxy]polyethenoxyethanol where Z is hydroxy, 2-[3-(1-alkarylthio-3-aroxy - 2 - propoxy)-2-hydroxy-1-propoxy]polyethenoxyethyl chloride where Z is chloride, or 2-[3-(1-alkarylthio-3-aroxy - 2 - propoxy) - 2-hydroxy-1-propoxy]polyethenoxyethyl alkyl ether where Z is alkoxy.

Also, where m is greater than 1, R is alkaryl, and R' is hydrogen, the adduct is a 2-[3-alkarylthiopoly(ethenoxy)-2-hydroxy - 1 - propoxy]polyethenoxyethanol where Z is hydroxy, 2-[3-alkarylthiopoly(ethenoxy)-2-hydroxy-1-propoxy]polyethenoxyethyl chloride where Z is chloride, or 2-[3-alkarylthiopoly(ethenoxy)-2-hydroxy-1-propoxy]polyethenoxyethyl alkyl ether where Z is alkoxy. Where m is greater than 1, R is alkaryl, and R' is alkyl, the adduct is a 2-[3-alkarylthiopoly(alkenoxy)-2-hydroxy-1-propoxy]polyethenoxyethanol where Z is hydroxy, 2-[alkarylthiopoly(alkenoxy)-2-hydroxy-1-propoxy]polyethenoxyethyl chloride where Z is chloride, or 2 - [3 - alkarylthiopoly(alkenoxy) - 2 - hydroxy - 1 - propoxy]polythenoxyethyl alkyl ether where Z is alkoxy. Where m is greater than 1, R is alkaryl and R' is chloromethyl, the adduct is a 2-{3-[1-alkarylthiopoly(3-chloro-2 - propenoxy)] - 2 - hydroxy - 1 - propoxy}polyethenoxyethanol were Z is hydroxy, 2-{3-[1-alkarylthiopoly(3-chloro - 2 - propenoxy)] - 2 - hydroxy - 1 - propoxy} polyethenoxyethyl chloride where Z is chloride, or 2-{3-[1 - alkarylthiopoly(3 - chloro - 2 - propenoxy)] - 2-hydroxy-1-propoxy}polyethenoxyethyl alkyl ether where Z is alkoxy. Where m is greater than 1, R is alkaryl and R' is hydroxymethyl, the adduct is a 2-{3-[1-alkarylthiopoly(3 - hydroxy - 2 - propenoxy)] - 2 - hydroxy - 1-propoxy}polyethenoxyethanol where Z is hydroxy, 2-{3-[1 - alkarylthiopoly(3 - hydroxy - 2 - propenoxy)] - 2-hydroxy-1-propoxy}polyethenoxyethyl chloride where Z is chloride, or 2-{3-[1-alkarylthiopoly(3-hydroxy-2-propenoxy)]-2-hydroxy-1-propoxy}polyethenoxyethyl alkyl ether where Z is alkoxy. Where m is greater than 1, R is alkaryl, and R' is alkoxymethyl, the adduct is a 2 - {3 - [1 - alkarylthiopoly(3 - alkoxy - 2 - propenoxy)]-2-hydroxy-1-propoxy}polyethenoxyethanol where Z is hydroxy, 2-{3-[1-alkarylthiopoly(3-alkoxy-2-propenoxy)]-2-hydroxy-1-propoxy}polyethenoxyethyl chloride where Z is chloride, or 2-{3-[1-alkarylthiopoly(3-alkoxy-2-propenoxy)]-2-hydroxy-1-propoxy}polyethenoxyethyl alkyl ether where Z is alkoxy. Where m is greater than 1, R is alkaryl, and R' is alkaroxymethyl, the adduct is a 2-{3-[1-alkarylthiopoly(3-alkaroxy-2-propenoxy)] - 2 - hydroxy-1-propoxy}polyethenoxyethanol where Z is hydroxy, 2-{3 - [1 - alkarylthiopoly(3 - alkaroxy - 2 - propenoxy)]-2-hydroxy-1-propoxy}polyethenoxyethyl chloride where Z is chloride, or 2-{3-[1-alkarylthiopoly(3-alkaroxy-2-propenoxy)]-2-hydroxy - 1 - propoxy}polyethenoxyethyl alkyl ether where Z is alkoxy. Where m is greater than 1, R is alkaryl, and R' is aroxymethyl, the adduct is a 2 - {3 - 1 - alkarylthiopoly(3 - aroxy - 2- propenoxy)]-2-hydroxy-1-propoxy}polyethenoxyethanol where Z is hydroxy, or 2-{3-[1-alkarylthiopoly(3 - aroxy - 2 - propenoxy)]-2-hydroxy-1-propoxy}polyethenoxyethyl chloride where Z is chloride, or 2-{3-[1-alkarylthiopoly(3-aroxy-2-propenoxy)]-2-hydroxy - 1 - propoxy}polyethenoxyethyl alkyl ether where Z is alkoxy.

The ethanoxy-substituted glycidyl ether and alcohol or mercaptan adducts of this invention are stable, usually water soluble, waxy solids or viscous liquids which vary in color from colorless to light yellow to orange. In general, they are more soluble in cold water than in hot water. They have cloud points which vary in range from 0° C. to approximately 100° C., depending upon the number of ethenoxy groups present in the molecule.

These adducts are valuable articles of commercial interest and have many varied uses, particularly as surfactants. They can be used as wetting, frothing or washing agents in the treatment and processing of textiles, for dyeing, for pasting of dyestuffs, fulling, sizing, impregnating and bleaching, and the like. In addition, these compounds are useful for preparing foam in fire extinguishers, for use as froth floation agents, as air entraining agents for concrete or cement, and as aids in the preparation of other articles of commerce. These adducts are particularly useful in soap and synthetic detergent compositions because many of these adducts have very high detersive efficiencies as well as good lime soap dispersion properties. Although these adducts are generally more soluble in cold water than in hot water, they are sufficiently soluble in hot water to be useful in detergent and soap compositions for use in both hot and cold water. They are particularly useful in cold water applications and have above average detersive efficiencies in cold water. The detersive efficiencies of these adducts are very high in water containing a large amount of hardness as well as in soft water. The advantages, desirability and usefulness of the present invention are illustrated by the following examples.

*Example 1*

In this example, 3-[2-hydroxypolyethenoxy]-1-chloro-2-propanol was prepared by heating 480 g. (1.20 moles) of a polyethylene glycol having an average molecular weight of 400 and 55.5 g. (0.60 mole) of epichlorohydrin. The polyethylene glycol containing 1.0 ml. of a boron trifluoride-diethyl ether complex as catalyst was placed in the reaction flask and heated to a temperature of 85° C. and the epichlorohydrin was added dropwise with stirring during a period of 1 hour while maintaining the temperature constant. After addition of all of the epichlorohydrin, the reaction mixture was heated for an additional hour with stirring while maintaining the temperature at 85° C.

In preparing the final product, 258.6 g. (0.20 mole of chloropropanol equivalent) of the 3-[2-hydroxypolyethenoxy]-1-chloro-2-propanol and 52.0 g. (0.15 mole) of dinonylphenol were placed in a reaction flask and heated to a temperature of 80° C. Thereafter, 21.0 ml. of 14.3 N sodium hydroxide solution was added dropwise during a period of 1 hour while maintaining the temperature at the same level and then heated for an additional 2 hours while maintaining the temperature at 80–90° C. At the end of this time, the reaction mixture was extracted three times with a hot sodium chloride solution to remove unconverted polyethylene glycol. The product was then extracted six times with hexane and a small amount of methanol to remove the oily by-products. The dissolved solvent was then removed by distillation and the product taken up in diethyl ether. After drying the product over magnesium sulfate, the product was filtered to remove the magnesium sulfate and added activated charcoal. The filtrate was then heated under vacuum to remove the solvent. There was obtained 88.9 g. of a dinonylphenol-polyethenoxy-substituted glycidyl ether condensate prepared from a polyethylene glycol having an average molecular weight of 400. The product, which was obtained in 73.8% yield, was a yellow colored liquid having a refractive index $n_D^{25}$ 1.4859 and a cloud point of 75° C.

*Example 2*

In this example, 3-[2-hydroxypolyethenoxy]-1-chloro-2-propanol was prepared from a polyethylene glycol having an average molecular weight of 300 and epichlorohydrin. The polyethylene glycol in an amount of 900 g. (3.0 moles) was heated to a temperature of 85° C. in a reaction flask containing 1.0 ml. of a boron trifluoride-diethyl ether complex. Thereafter, 92.5 g. (1.0 mole) of epichlorohydrin was added dropwise with stirring during a period of 1.5 hours. Upon completion of the epichlorohydrin addition, the reaction mixture was heated for an additional 1 hour while maintaining the temperature at 85° C. and stirring.

In the preparation of the adduct, 248 g. (0.25 mole) of the above prepared chloropropanol and 40.5 g. (0.20 mole) of tert-dodecyl mercaptan were placed in a reaction flask and heated to a temperature of 80° C. While maintaining the reaction flask and contents at this temperature, 21.0 ml. of 14.3 N sodium hydroxide solution was added with stirring during a period of 0.5 hour and then the reaction mixture was heated for an additional 2 hours while maintaining the temperature at 90–100° C. At the end of this time, the reaction mixture was vacuum steam distilled at a temperature up to 140° C. under a pressure of 25–40 mm. to remove the oily side-reaction products. The reaction mixture was then cooled to room temperature and extracted three times with 300 ml. portions of a petroleum ether. The mixture was then heated to 100° C. to remove the dissolved petroleum ether and extracted three times with hot aqueous saturated sodium chloride solution to remove the unconverted polyethylene glycol. The product was then taken up in diethyl ether and dried over magnesium sulfate. After removing the magnesium sulfate and added activated charcoal by filtration, the filtrate was heated under vacuum at a temperature up to 100° C. and a pressure of 12 mm. to remove the solvent and leave 98.2 g. of an adduct of tert-dodecyl mercaptan and a polyethenoxy-substituted glycidyl ether prepared from a polyethylene glycol having an average molecular weight of 300. The product, which was obtained in 87.9% yield, was a pale yellow liquid having a refractive index $n_D^{25}$ 1.4806 and a cloud point of 34.5° C. The analysis of this adduct was found to be 59.05 wt. percent carbon, 10.42 wt. percent hydrogen, and 5.69 wt. percent sulfur as compared with calculated values of 59.55 wt. percent carbon, 10.34 wt. percent hydrogen, and 5.48 wt. percent sulfur.

*Example 3*

In this example, 3-[2-hydroxypolyethenoxy]-1-chloro-2-propanol was prepared from 480 g. (1.60 moles) of a polyethylene glycol having an average molecular weight of 300 and 74.0 g. (0.80 mole) of epichlorohydrin. The polyethylene glycol and 1.0 ml. of a boron trifluoride-diethyl ether complex was heated in a reaction flask to a temperature of 85° C. and the epichlorohydrin added with stirring during a period of 1 hour while maintaining the same temperature. Thereafter, the reaction mixture was heated at this same temperature for an additional 1 hour.

In the preparation of the adduct, 28.0 ml. of 14.3 N sodium hydroxide solution was added dropwise during a period of 0.5 hour to 207.8 g. (0.30 mole) of the chloropropanol prepared above under conditions of rapid agitation while maintaining the temperature at 25–35° C. and then stirred for an additional 15 mins. This mixture was then added dropwise with stirring to 39.4 g. (0.15 mole) of dodecylphenol in a reaction flask maintained at 90° C. After complete addition of the mixture, the reaction mixture was heated for an additional 1 hour at a temperature of 90–100° C. with stirring. At the end of this time, the reaction mixture was vacuum steam distilled at a temperature up to 150° C. and a pressure of 20–40 mm. to remove oily side-reaction products. The residue from the distillation was then extracted three times with hot aqueous sodium chloride solution to remove the unconverted polyethylene glycol. The product was then taken up in diethyl ether and dried over magnesium sulfate. After removal of the magnesium sulfate and added activated charcoal by filtration, the filtrate was heated under vacuum to remove the solvent. The product from this distillation was found to be turbid in water and was then diluted with methanol and extracted six times with hexane. The product was again heated in vacuum to remove dissolved solvents and leave 62.4 g. of an adduct of dodecylphenol and polyethenoxy-substituted glycidyl ether of an average molecular weight of 300. This product was an orange-yellow colored viscous liquid having a refractive index $n_D^{25}$ 1.4878 and a cloud point of about 70° C.

*Example 4*

In this example, a 3-[2-hydroxypolyethenoxy]-1-chloro-2-propanol was prepared from 480 g. (1.60 moles) of a polyethylene glycol having an average molecular weight of 300 and 70.4 g. (0.80 mole) of epichlorohydrin. The polyethylene glycol and 1.0 ml. of a boron trifluoride-diethyl ether complex was heated in a reaction flask to a temperature of 85° C. and the epichlorohydrin added dropwise with stirring during a period of 1 hour while maintaining the temperature constant. After completion of the addition of the epichlorohydrin, the reaction mixture was heated for an additional 1 hour at this same temperature.

In making the adduct, 40.5 g. (0.20 mole) of n-dodecylmercaptan and 173 g. (0.25 mole) of the chloropropanol prepared above were mixed with 21.0 ml. of 14.3 N sodium hydroxide solution while adding the sodium hydroxide during a period of 0.5 hour. The temperature of the reaction mixture rose from 20° C. to approximately 60° C. during addition of the sodium hydroxide. The reaction mixture was then heated for an additional 2 hours at a temperature of 70° C. with stirring. At the end of this time, the reaction mixture was vacuum steam distilled at a temperature up to 120° C. and a pressure of 50–80 mm. to remove oily side-reaction products. The reaction mixture was then extracted three times with hot, saturated sodium chloride solution to remove unconverted polyethylene glycol. The product was then taken up in diethyl ether and dried over magnesium sulfate. After removing the magnesium sulfate and added activated charcoal by filtration, the filtrate was heated under vacuum to remove the solvent and leave 103.7 g. of an adduct of n-dodecylmercaptan and a polyethenoxy-substituted glycidyl ether prepared from a polyethylene glycol of an average molecular weight of 300. This product, which was obtained in 92.8% yield, is a pale yellow liquid having a refractive index $n_D^{25}$ 1.4737 and a cloud point of 59° C. The analysis of this compound was found to be 60.48 wt. percent carbon, 10.47 wt. percent hydrogen, and 5.66 wt. percent sulfur as compared with calculated values of 59.55 wt. percent carbon, 10.34 wt. percent hydrogen and 5.48 wt. percent sulfur.

*Example 5*

In this example, a 3-(2-hydroxypolyethenoxy)-1-chloro-2-propanol was prepared from 480 g. (1.20 moles) of a polyethylene glycol having an average molecular weight of 400 and 55.5 g. (0.60 mole) of epichlorohydrin. The polyethylene glycol and 1.0 ml. of a boron trifluoride-diethyl ether complex were heated in a reaction flask to a temperature of 85° C. and the epichlorohydrin added dropwise with stirring during a period of 1 hour while maintaining the temperature constant. After completing the addition of the epichlorohydrin, the reaction product was heated for an additional 1 hour at the same temperature with stirring.

In forming the adduct, 160 g. (0.18 mole) of the chloropropanol prepared above and 39.4 g. (0.15 mole) of dodecylphenol were placed in a reaction flask and heated to a temperature of 90° C. Thereafter, 15.4 ml. of 14.3 N sodium hydroxide solution was added to the reaction mixture with stirring during a period of 1 hour while maintaining the temperature constant. The reaction mixture was then heated for an additional 1 hour at this temperature. At the end of this time, the reaction mixture was neutralized with dilute hydrochloric acid and steam distilled under vacuum at a temperature up to 160° C. and a pressure of 20–30 mm. to remove the oily side-reaction products. The reaction mixture was then extracted three times with hot sodium chloride solution to remove unconverted polyethylene glycol. The product was then taken up in diethyl ether and dried over magnesium sulfate. After removing the magnesium sulfate and added activated charcoal by filtration, the filtrate was heated under vacuum at a temperature up to 140° C. under a pressure of 12 mm. to remove the solvent and leave 95.7 g. of an adduct of dodecylphenol and polyethenoxy-substituted glycidyl ether prepared from a polyethylene glycol having an average molecular weight of 400. The product, which was obtained in 88.8% yield, was a deep orange colored viscous liquid having a refractive index $n_D^{25}$ 1.4900 and a cloud point of 77° C. Analysis of this product was found to be 64.55 wt. percent carbon and 9.87 wt. percent hydrogen as compared with calculated values of 64.50 wt. percent carbon and 9.94 wt. percent hydrogen.

*Example 6*

In this example, a 3-(2-hydroxypolyethenoxy)-1-chloro-2-propanol was prepared from 600 g. (3.0 moles) of a polyethylene glycol having an average molecular weight of 200 and 137.8 g. (1.50 moles) of epichlorohydrin. The polyethylene glycol and 1.0 ml. of boron trifluoride-diethyl ether complex were placed in a reaction flask and heated with stirring to a temperature of 85° C. and the epichlorohydrin added dropwise during a period of 2.5 hours. After completing the addition of the epichlorohydrin, the reaction mixture was heated for an additional 1 hour at the same temperature with stirring.

In forming the adduct, 50.6 g. (0.25 mole) of n-dodecyl mercaptan and 147.6 g. (0.30 mole) of the chloropropanol prepared above were placed in a reaction flask and heated to a temperature of 50° C. Then 28.0 ml. of 14.3 N sodium hydroxide solution was added dropwise with stirring during a period of 30 minutes with the temperature increasing spontaneously from 50° C. to 90° C. during this period of time. The reaction mixture was then heated for an additional 1 hour at 90° C. At the end of this time, the reaction mixture was vacuum steam distilled at a temperature up to 120° C. and a pressure of 15–25 mm. to remove the oily side-reaction products. The reaction mixture was then extracted three times with hot aqueous sodium chloride solution to remove unconverted polyethylene glycol. The product was then taken up in diethyl ether and dried over magnesium sulfate. After removal of the magnesium sulfate and added activated charcoal by filtration, the filtrate was heated under vacuum at a temperature up to 130° C. under pressure of 12 mm. to leave 106.9 g. of an adduct of n-dodecylmercaptan and a polyethenoxy-substituted glycidyl ether prepared from a polyethylene glycol having an average molecular weight of 200. The product, which was obtained in a yield of 93.3%, was a pale yellow colored liquid having a refractive index $n_D^{25}$ 1.4743 and a cloud point of 19° C. Analysis of this product was found to be 61.08 wt. percent carbon, 10.47 wt. percent hydrogen and 6.65 wt. percent sulfur as compared with calculated values of 60.72 wt. percent carbon, 10.61 wt. percent hydrogen and 6.75 wt. percent sulfur.

*Example 7*

In this example, a 3-[2-hydroxypolyethenoxy]-1-chloro-2-propanol was prepared from 480 g. (1.60 moles) of a polyethylene glycol having an average molecular weight of 300 and 74.0 g. (0.80 mole) of epichlorohydrin. The polyethylene glycol and 1.0 ml. of a boron trifluoride-diethyl ether complex were placed in a reaction flask and heated to a temperature of 85° C. and the epichlorohydrin added dropwise with stirring during a period of 1 hour while maintaining this temperature constant. After completion of the addition of the epichlorohydrin, the reaction product was heated for an additional 1 hour at this same temperature.

In forming the adduct, 207.8 g. (0.30 mole) of the chloropropanol prepared above and 52.5 g. (0.20 mole) of dodecylphenol were placed in a reaction flask and heated to a temperature of 90° C. Thereafter, 22.4 g. (0.40 mole) of potassium hydroxide made up to a 10 N solution, was added to the reaction flask dropwise with stirring during a period of 1 hour while maintaining the temperature constant. At the end of this time, the reaction mixture was heated for an additional 1 hour at this same temperature. The reaction product was then neutralized with dilute hydrochloric acid and vacuum steam distilled at a temperature up to 160° C. under a pressure of 20–30 mm. to remove the oily side-reaction products. The reaction mixture was then extracted three times with hot aqueous sodium chloride solution to remove the unconverted polyethylene glycol. The product was then taken up in diethyl ether and dried over magnesium sulfate. After removing the magnesium sulfate and added activated charcoal by filtration, the filtrate was heated under vacuum at a temperature up to 140° C. and a pressure of 12 mm. to remove the solvent and leave 114.4 g. of an adduct of dodecylphenol and polyethenoxy substituted glycidyl ether prepared from a polyethylene glycol having an average molecular weight of 300. The product, which was obtained in 80.0% yield, was a yellow colored liquid having a refractive index $n_D^{25}$ 1.4918 and a cloud point of approximately 70° C.

Example 8

The detergencies of some of the adducts of this invention were measured by employing the method described by J. C. Harris and E. L. Brown in the Journal of the American Oil Chemists Society, 27, 135–143 (1950). In this method, the detergency of the candidate adducts was compared with the detergency of Gardinol WA, a commercial detergent produced by sulfating the mixture of alcohols, principally $C_{12}$, obtained by hydrogenating coconut oil fatty acids. The following detersive efficiencies were measured at the temperature and water hardness indicated:

| Compound | 0 p.p.m. Water Hardness | | 50 p.p.m. Water Hardness, 60° C. | 300 p.p.m. Water Hardness, 60° C. |
| --- | --- | --- | --- | --- |
| | 25° C. | 60° C. | | |
| Adduct of Ex. 1 | | | 98 | |
| Adduct of Ex. 2 | 123 | 86 | | 85 |
| Adduct of Ex. 3 | 126 | 110 | | 104 |
| Adduct of Ex. 4 | 115 | 94 | | 83 |
| Adduct of Ex. 5 | 124 | 115 | | 113 |
| Adduct of Ex. 6 | 118 | 107 | | 99 |
| Adduct of Ex. 7 | 122 | 112 | | 108 |

Using the detergency evaluation procedure noted above, the detergency of "built" materials of the adducts of this invention were determined. The products were formulated by using 15% of the active surfactant with the balance of the formulation being composed of sodium tripolyphosphate, sodium tetrapyrophosphate, sodium silicate and soda ash. The following results were obtained:

| Compound | 50 p.p.m. Water Hardness, 60° C. | 300 p.p.m. Water Hardness, 60° C. |
| --- | --- | --- |
| Adduct of Ex. 1 | 115 | |
| Adduct of Ex. 2 | 123 | 126 |
| Adduct of Ex. 3 | 119 | 129 |
| Adduct of Ex. 4 | 117 | 132 |
| Adduct of Ex. 5 | 120 | 137 |
| Adduct of Ex. 6 | 115 | 120 |
| Adduct of Ex. 7 | 126 | 135 |

Example 9

In this example, the lime soap dispersion efficiencies of a number of the new adducts of this invention were determined using the procedure described by J. C. Harris in ASTM Bulletin 140, p. 113, May 1946. These results are reported in the table below wherein the dispersion number is equal to 10 times the milliliters of the test compound required to disperse 45.5 milligrams of calcium oleate formed.

Compound:                          Dispersion Number
Adduct of Ex. 1 _____ 10
Adduct of Ex. 2 _____ 10
Adduct of Ex. 3 _____ 10
Adduct of Ex. 4 _____ 10
Adduct of Ex. 5 _____ 10
Adduct of Ex. 6 _____ 10
Adduct of Ex. 7 _____ 20

As surface active compositions, the polyethenoxy-substituted glycidyl ether and alcohol or mercaptan adducts of this invention comprise either the pure compounds or an admixture of the pure compounds with an adjuvant or diluent. Ordinarily, the compounds of this invention are employed in surface active applications in a dilute form where the compound is dissolved or suspended in some liquid medium such as water or hydrocarbon solvents. The compounds of this invention can also be admixed with adjuvant materials, particularly when used in soap and synthetic detergent compositions, such as inorganic builders of the type such as carbonates, phosphates, silicates and fillers.

The adducts of this invention are particularly useful in soap and synthetic detergent compositions because the compounds possess good lime soap dispersion and detersive properties. The relative proportions of the adducts of this invention and the soap and/or synthetic detergent in the compositions may vary greatly, depending upon the use intended. Although useful detergent compositions can be formed by mixing small proportions of soap with large proportions of the adducts of this invention, usually the greatest value of soap compositions lie in compositions having less than 70% by weight of the adduct. In general, it is preferred to incorporate into these soap compositions about 5–50% by weight of the adduct based on the total weight of the soap and the adduct. Of course, other materials such as perfumes, fillers and inorganic builders of the type such as carbonates, phosphates and silicates can also be present in the composition.

The soaps which are useful in the novel compositions of this invention are the so-called water-soluble soaps of the soap-making art and include sodium, potassium, ammonium and amine salts of the higher fatty acids, that is those having about 8–20 carbon atoms per molecule. These soaps are normally prepared from such naturally-occurring esters as coconut oil, palm oil, olive oil, cottonseed oil, tung oil, corn oil, castor oil, soybean oil, wood fat, tallow, whale oil, and the like, as well as mixtures of these.

Reasonable variation and modification of the invention as described are possible, the essence of which is that there have been provided (1) methods for preparing adducts of ethenoxy-substituted glycidyl ethers and an alcohol or a mercaptan from glycidyl ethers and an ethylene glycol and (2) said adducts as new compounds.

We claim:

1. The method which comprises reacting a glycidyl ether derived from a reaction mixture comprising more than one mole of an ethylene glycol per mole of epichlorohydrin of an ethylene glycol with a compound selected from the group consisting of alkyl alcohol, alkaryl alcohol, alkyl mercaptan, and alkaryl mercaptan and recovering from the resulting reaction mixture as product, an adduct of an ethenoxy-substituted glycidyl ether derived from a reaction mixture comprising more than one mole of an ethylene glycol per mole of epichlorohydrin and a compound selected from the group consisting of alcohol and mercaptan.

2. The method which comprises reacting a molecular excess of an ethylene glycol with epichlorohydrin, reacting the resulting reaction mixture with a compound selected from the group consisting of alkyl alcohol, alkaryl alcohol, alkyl mercaptan, and alkaryl mercaptan in an alkaline reaction mixture, and recovering from the last resulting reaction mixture an adduct of an ethenoxy-substituted glycidyl ether derived from a reaction mixture comprising more than one mole of an ethylene glycol per mole of epichlorohydrin and a compound selected from the group consisting of alcohol and mercaptan.

3. The method which comprises reacting a molecular excess of an ethylene glycol with epichlorohydrin, reacting the resulting reaction mixture with a compound of the formula

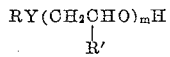

wherein R is selected from the group consisting of alkyl and alkaryl radicals having from 8 to 24 carbon atoms, Y is selected from the group consisting of oxygen and sulfur, $m$ is a whole number of from 0 to 10 inclusive, and R' is selected from the group consisting of hydrogen, hydroxymethyl, chloromethyl, alkoxymethyl, aroxymethyl, alkaroxymethyl, alkyl radicals, and mixtures thereof, in an alkaline reaction mixture, and recovering from the last resulting reaction mixture an adduct of the formula

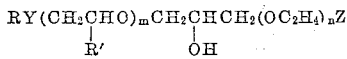

wherein R, Y, $m$, and R' are as above defined, $n$ is an integer of from 1 to 100, and Z is selected from the group consisting of hydroxy, alkoxy, and chloro.

4. The method which comprises reacting a molecular excess of an ethylene glycol with epichlorohydrin to form an ethenoxy-substituted chloropropanol, reacting the said ethenoxy-substituted chloropropanol with a compound selected from the group consisting of alkyl alcohol, alkaryl alcohol, alkyl mercaptan, and alkaryl mercaptan in an alkaline reaction mixture to form an adduct of ethenoxy-substituted glycidyl ether derived from a reaction mixture comprising more than one mole of an ethylene glycol per mole of epichlorohydrin and a compound selected from the group consisting of alcohol and mercaptan, and recovering said adduct as product.

5. The method which comprises reacting a molecular excess of an ethylene glycol with epichlorohydrin to form an ethenoxy-substituted chloropropanol, reacting the resulting ethenoxy-substituted chloropropanol with a compound of the formula

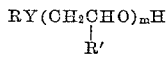

wherein R is selected from the group consisting of alkyl and alkaryl radicals having from 8 to 24 carbon atoms, Y is selected from the group consisting of oxygen and sulfur, $m$ is a whole number of from 0 to 10 inclusive, and R' is selected from the group consisting of hydrogen, hydroxymethyl, chloromethyl, alkoxymethyl, aroxymethyl alkaryloxymethyl, alkyl radicals, and mixtures thereof, in an alkaline reaction mixture to form an adduct of the formula

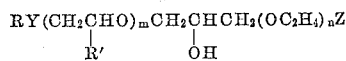

wherein R, Y, $m$ and R' are as above defined, $n$ is an integer of from 1 to 100, and Z is selected from the group consisting of hydroxy, alkoxy, and chloro, and recovering said adduct as product.

6. The method which comprises reacting a molecular excess of an ethylene glycol of the formula

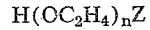

wherein $n$ is an integer of from 1 to 100 and Z is selected from the group consisting of hydroxy, alkoxy, and chloro, with epichlorohydrin, reacting the resulting reaction mixture with a compound selected from the group consisting of alkyl alcohol, alkaryl alcohol, alkyl mercaptan, and alkaryl mercaptan in an alkaline reaction mixture, and recovering from the last resulting reaction mixture an adduct of ethenoxy-substituted glycidyl ether derived from a reaction mixture comprising more than one mole of an ethylene glycol per mole of epichlorohydrin and a compound selected from the group consisting of alcohol and mercaptan.

7. The method which comprises reacting a molecular excess of an ethylene glycol of the formula

wherein $n$ is an integer of from 1 to 100 and Z is selected from the group consisting of hydroxy, alkoxy, and chloro, with epichlorohydrin to form an ethenoxy-substituted chloropropanol, reacting said ethenoxy-substituted chloropropanol with a compound selected from the group consisting of alkyl alcohol, alkaryl alcohol, alkyl mercaptan, and alkaryl mercaptan in an alkaline reaction mixture to form an adduct for ethenoxy-substituted glycidyl ether derived from a reaction mixture comprising more than one mole of an ethylene chloride per mole of epichlorohydrin and a compound selected from the group consisting of alcohol and mercaptan and recovering said adduct as product.

8. The method which comprises reacting a molecular excess of an ethylene glycol of the formula

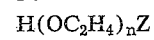

wherein $n$ is an integer of from 1 to 100 and Z is selected from the group consisting of hydroxy, alkoxy and chloro, with epichlorohydrin, reacting the resulting reaction mixture with a compound of the formula

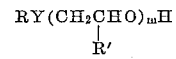

wherein R is selected from the group consisting of alkyl and alkaryl radicals having from 8 to 24 carbon atoms, Y is selected from the group consisting of oxygen and sulfur, $m$ is a whole number of from 0 to 10 inclusive, and R' is selected from the group consisting of hydrogen, hydroxymethyl, chloromethyl, alkoxymethyl, aroxymethyl, alkaroxymethyl, alkyl radicals, and mixtures thereof, in an alkaline reaction mixture, and recovering from the last resulting reaction mixture an adduct of the formula

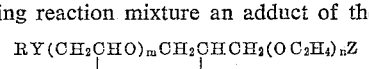

wherein R, Y, $m$, R', $n$, and Z are as above defined.

9. The method which comprises reacting a molecular excess of an ethylene glycol of the formula

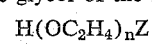

wherein $n$ is an integer of from 1 to 100 and Z is selected from the group consisting of hydroxy, alkoxy, and chloro, with epichlorohydrin to form an ethenoxy-substituted chloropropanol, reacting the resulting ethenoxy-substituted chloropropanol with a compound of the formula

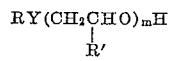

wherein R is selected from the group consisting of alkyl and alkaryl radicals having from 8 to 24 carbon atoms, Y is selected from the group consisting of oxygen and sulfur, $m$ is a whole number of from 0 to 10 inclusive, and R' is selected from the group consisting of hydrogen, hydroxymethyl, chloromethyl, alkoxymethyl, aroxymethyl, alkaroxymethyl, alkyl radicals, and mixtures thereof, in an alkaline reaction mixture to form an adduct of the formula

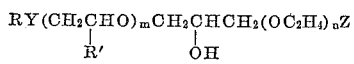

wherein R, Y, $m$, R', $n$, and Z are as above defined, and recovering said adduct as product.

10. The method which comprises reacting a molecular excess of an ethylene glycol of the formula $$H(OC_2H_4)_nZ$$

wherein $n$ is an integer of from 1 to 100 and Z is selected from the group consisting of hydroxy, alkoxy, and chloro, with epichlorohydrin, reacting the resulting reaction mixture with a compound of the formula

wherein R is selected from the group consisting of alkyl, and alkaryl radicals having from 8 to 24 carbon atoms, $m$ is a whole number of from 0 to 10 inclusive, and R' is selected from the group consisting of hydrogen, hydroxymethyl, chloromethyl, alkoxymethyl, aroxymethyl, alkaroxymethyl, alkyl radicals, and mixtures thereof, in an alkaline reaction mixture, and recovering from the last resulting reaction mixture an adduct of the formula

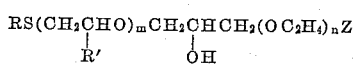

wherein R, $m$, R', $n$, and Z are as above defined.

11. The method which comprises reacting a molecular excess of an ethylene glycol of the formula $$H(OC_2H_4)_nZ$$

wherein $n$ is an integer of from 1 to 100 and Z is selected from the group consisting of hydroxy, alkoxy, and chloro, with epichlorohydrin, reacting the resulting reaction mixture with a compound of the formula

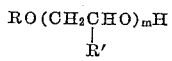

wherein R is selected from the group consisting of alkyl and alkaryl radicals having from 8 to 24 carbon atoms, $m$ is a whole number of from 0 to 10 inclusive, and R' is selected from the group consisting of hydrogen, hydroxymethyl, chloromethyl, alkoxymethyl, aroxymethyl, alkaroxymethyl, alkyl radicals, and mixtures thereof, in an alkaline reaction mixture, and recovering from the last resulting reaction mixture an adduct of the formula

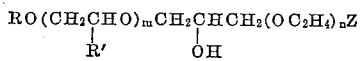

wherein R, $m$, R', $n$, and Z are as above defined.

12. The method which comprises reacting a molecular excess of a polyethylene glycol having an average molecular weight of 400 with epichlorohydrin to form a polyethenoxy-substituted chloropropanol, reacting said chloropropanol with dinonylphenol in the presence of sodium hydroxide to form an adduct of dinonylphenol and a polyethenoxy-substituted glycidyl ether prepared from a reaction mixture comprising more than one mole of polyethylene glycol of 400 average molecular weight per mole of epichlorohydrin, and recovering said adduct as product.

13. The method which comprises reacting a molecular excess of a polyethylene glycol having an average molecular weight of 300 with epichlorohydrin to form a polyethenoxy-substituted chloropropanol, reacting said chloropropanol with tert-dodecyl mercaptan in the presence of sodium hydroxide to form an adduct of tert-dodecyl mercaptan and a polyethenoxy-substituted glycidyl ether prepared from a reaction mixture comprising more than one mole of polyethylene glycol of 300 average molecular weight per mole of epichlorohydrin, and recovering said adduct as product.

14. The method which comprises reacting a molecular excess of a polyethylene glycol having an average molecular weight of 300 with epichlorohydrin to form a polyethenoxy-substituted chloropropanol, reacting said chloropropanol with dodecylphenol in the presence of sodium hydroxide to form an adduct of dodecylphenol and a polyethenoxy-substituted glycidyl ether prepared from a reaction mixture comprising more than one mole of polyethylene glycol of 300 average molecular weight per mole of epichlorohydrin, and recovering said adduct as product.

15. The method which comprises reacting a molecular excess of a polyethylene glycol having an average molecular weight of 300 with epichlorohydrin to form a polyethenoxy-substituted chloropropanol, reacting said chloropropanol with n-dodecyl mercaptan in the presence of sodium hydroxide to form an adduct of n-dodecyl mercaptan and a polyethenoxy substituted glycidyl ether prepared from a reaction mixture comprising more than one mole of polyethylene glycol of 300 average molecular weight per mole of epichlorohydrin, and recovering said adduct as product.

16. The method which comprises reacting a molecular excess of a polyethylene glycol having an average molecular weight of 400 with epichlorohydrin to form a polyethenoxy-substituted chloropropanol, reacting said chloropropanol with dodecylphenol in the presence of sodium hydroxide to form an adduct of dodecylphenol and a polyethenoxy-substituted glycidyl ether prepared from a reaction mixture comprising more than one mole of polyethylene glycol of 400 average molecular weight per mole of epichlorohydrin, and recovering said adduct as product.

17. The method which comprises reacting a molecular excess of a polyethylene glycol having an average molecular weight of 200 with epichlorohydrin to form a polyethenoxy-substituted chloropropanol, reacting said chloropropanol with n-dodecyl mercaptan in the presence of sodium hydroxide to form an adduct of n-dodecyl mercaptan and a polyethenoxy-substituted glycidyl ether prepared from a reaction mixture comprising more than one mole of polyethylene glycol of 200 average molecular weight per mole of epichlorohydrin and recovering said adduct as product.

18. The method which comprises reacting a molecular excess of a polyethylene glycol having an average molecular weight of 300 with epichlorohydrin to form a polyethenoxy-substituted chloropropanol, reacting said chloropropanol with dodecylphenol in the presence of potassium hydroxide to form an adduct of dodecylphenol and a polyethenoxy-substituted glycidyl ether prepared from a reaction mixture comprising more than one mole of polyethylene glycol of 300 average molecular weight per mole of epichlorohydrin and recovering said adduct as product.

References Cited in the file of this patent

UNITED STATES PATENTS

| | | |
|---|---|---|
| 2,178,831 | Bruson | Nov. 7, 1939 |
| 2,392,103 | Schlosser et al. | Jan. 1, 1946 |
| 2,508,035 | Kosmin | May 16, 1950 |
| 2,508,036 | Kosmin | May 16, 1950 |
| 2,619,508 | Mikeska et al. | Nov. 25, 1952 |

FOREIGN PATENTS

| | | |
|---|---|---|
| 796,508 | Great Britain | June 11, 1958 |